A. C. STEWART.
CARBURETING DEVICE FOR HEAVY FUELS.
APPLICATION FILED FEB. 27, 1911.
1,017,186.
Patented Feb. 13, 1912.
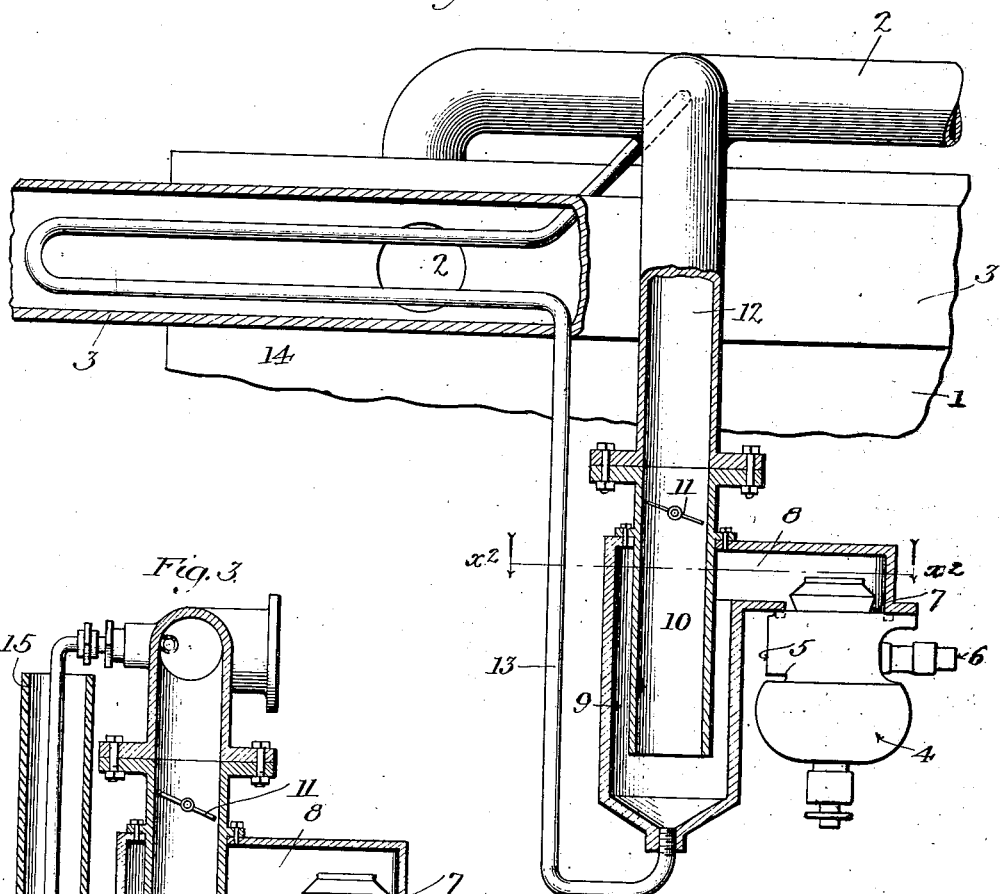
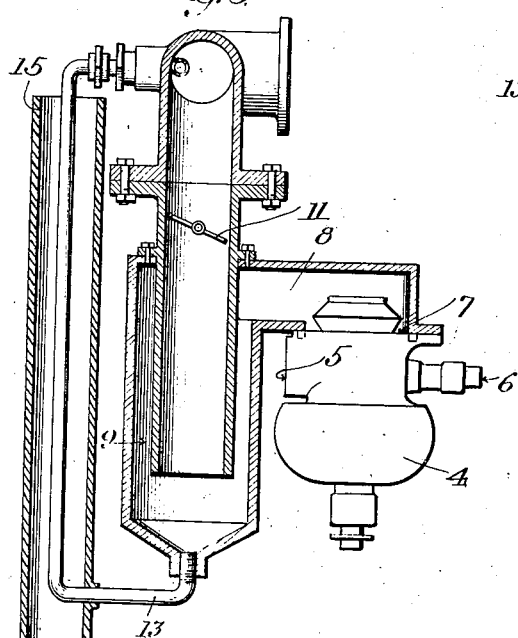
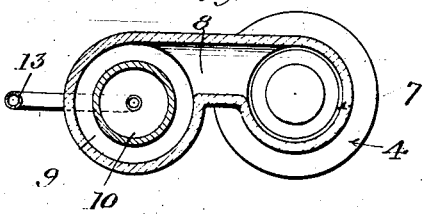

UNITED STATES PATENT OFFICE.

ALFRED C. STEWART, OF LOS ANGELES, CALIFORNIA.

CARBURETING DEVICE FOR HEAVY FUELS.

1,017,186.  Specification of Letters Patent.  Patented Feb. 13, 1912.

Application filed February 27, 1911. Serial No. 611,287.

*To all whom it may concern:*

Be it known that I, ALFRED C. STEWART, a citizen of the United States, residing at Los Angeles, in the county of Los Angeles and State of California, have invented a new and useful Carbureting Device for Heavy Fuels, of which the following is a specification.

This invention relates to means for producing combustible or explosive mixtures for use in internal combustion engines, and the main object of the invention is to provide for utilization of comparatively heavy oils such as distillate for this purpose.
It is found that a considerable proportion of the distillate when supplied through an ordinary carbureter is not delivered to the engine in vaporized and mixed condition, but tends to condense and deposit in the passages between the carbureter and the cylinders of the engine.

The present invention provides for vaporization of such condensed or condensable portions of the fuel and delivery thereof to the cylinders of the engine as a part of the mixture.

Other objects of the invention appear hereinafter.

The accompanying drawings illustrate the invention, and referring thereto: Figure 1 is an elevation of the device with parts in section. Fig. 2 is a section on line $x^2$—$x^2$ in Fig. 1. Fig. 3 is a vertical section showing another form of the device.
Referring to Fig. 1, an engine cylinder is indicated at 1, provided with induction pipe or inlet manifold 2, and with eduction or exhaust pipe 3. A carbureter 4 of any usual or suitable construction is provided with air inlet 5, oil inlet 6 and outlet 7, said outlet communicating with a chamber or passage 8, formed as a lateral extension from the upper end of a tubular casing or chamber 9. The passage 8 preferably enters said casing 9 in a tangential direction. A tube or pipe 10 extends downwardly within said tubular casing 9 and may be provided with a throttle valve 11 for controlling the supply to the engine, said tube or pipe 10 being connected to the inlet manifold 2 by a tubular connection 12. A pipe or tubular connection 13 leads from the bottom of the tubular casing or chamber 9 to a part of the inlet pipe or manifold 2, adjacent to the inlet ports of the engine and at some portion in its length this pipe or tubular connection 13 is provided with a portion 14 extending within heating means, for example, the exhaust pipe 3 for the engine.

The operation of the device is as follows:
The engine being in operation and the throttle 11 being open, air is drawn through the carbureter at each stroke of the engine and a certain amount of liquid fuel is drawn with the air through the carbureter. The invention is particularly intended for cases where the liquid fuel is of such heavy nature that it cannot be thoroughly vaporized and mixed in the carbureter, and the carbureter 4 therefore serves primarily as a measuring or feeding device for supplying to the air a definite amount of liquid fuel in accordance with the demands of the engine. The air and imperfectly mixed oil pass through the passage 8 into the tubular casing or chamber 9, preferably in a tangential direction and the effect of the rotary or vortical movement thereby set up in the body of air, tends to cause the particles of liquid or unvaporized oil to fly outwardly and to be deposited on the side walls of the tubular casing 9 whence they run down into the bottom of the tubular casing and into the connection 13. The air, together with the portions of the oil already vaporized, pass to the center of the chamber 9 and upwardly within the pipes 10 and 12 into the intake connection of the engine. The condition of suction existing in this intake connection of the engine is such that when the throttle is nearly closed, for example, in starting, oil or liquid fuel is drawn from the bottom of the chamber 9, through the connection 13, into the portion 14 where it is subjected to heat by the action of the exhaust products of combustion passing into exhaust pipe 3, and oil is thereby vaporized and vapor is drawn from such heating portion 14 into the intake 2 where it is mixed with the air and vapor mixture passing upwardly through the pipes 10 and 12.

Instead of using the exhaust gas for heating the condensed fuel in its passage from the separator 9 to the intake 2 of the engine, any other suitable heating means may be used. Thus, as shown in Fig. 2, the connection 13 may lead through a pipe 15, heated by a burner 16, the construction being otherwise as above described.

What I claim is:

1. In combination with an inlet means for an internal combustion engine and a carbureter for supplying air and oil in definite proportions, of a chamber connected to said carbureter and adapted to receive the oil therefrom and provided with means for collecting condensed oil, a connection from said chamber to the said inlet means for passage of vapor and air to said air inlet means, said connection being provided with a throttle and a connection from the lower part of said chamber to said air inlet means for passage of condensed fuel from said chamber to the said oil inlet means and means for supplying heat to said fuel connection.

2. In combination with an inlet means for an internal combustion engine and a carbureter for supplying air and oil in definite proportions of a chamber connected to said carbureter and adapted to receive the oil therefrom and provided with means for collecting condensed oil, a connection from said chamber to the said inlet means for passage of vapor and air to said air inlet means, said connection being provided with a throttle and a connection from the lower part of said chamber to said air inlet means for passage of condensed fuel from said chamber to the said air inlet means, said engine having an exhaust connection extending in heat transmitting relation to a part of said fuel connection to supply heat thereto.

3. The combination with inlet means for an internal combustion engine, of a carbureter, separating means connected to the carbureter to receive the mixture of oil and air therefrom and to separate the unvaporized from the vaporized oil, a connection from the said separating means to said inlet means for delivering the mixture of air and oil vapor from the said separating means to said inlet means, a throttle in said connection and heating means connected to receive the unvaporized oil from the separating means and connected to the said inlet means to deliver thereto the oil vapor from such heating means.

4. In combination with inlet means for an internal combustion engine, a carbureter, a separating chamber having an inlet connected to said carbureter, and having an outlet connected to the engine inlet means, a throttle controlling communication from said outlet to the engine inlet means and separating means extending into said chamber to deflect the mixture passing therethrough toward the bottom of the chamber so as to separate the unvaporized oil from the mixture, a fuel connection leading from the lower part of said fuel collecting chamber to the engine inlet means, and means for heating said fuel connection.

5. In combination with inlet means for an internal combustion engine, a carbureter, a separating chamber having an inlet connected to said carbureter, and having an outlet connected to the engine inlet means, a throttle controlling communication from said outlet to the engine inlet means and separating means extending into said chamber to deflect the mixture passing therethrough toward the bottom of the chamber so as separate the unvaporized oil from the mixture, a fuel connection leading from the lower part of said fuel collecting chamber to the engine inlet means, and means for heating said fuel connection, said fuel separating means consisting of a tubular member extending from the outlet of said chamber downwardly and opening into said chamber and said chamber surrounding said tubular member, leaving a space between said tubular member and the wall of said chamber, and the inlet means for said chamber opening tangentially through the wall of said chamber to deliver the mixture into said space with a whirling motion.

In testimony whereof, I have hereunto set my hand at Los Angeles, California this 17 day of February, 1911.

ALFRED C. STEWART.

In presence of—
ARTHUR P. KNIGHT,
F. A. CRANDALL.